US009025647B2

(12) United States Patent
Schwager et al.

(10) Patent No.: US 9,025,647 B2

(45) Date of Patent: May 5, 2015

(54) DEVICE FOR USE IN A POWER LINE COMMUNICATION SYSTEM, POWER LINE COMMUNICATION SYSTEMS AND POWER LINE COMMUNICATION METHOD

(75) Inventors: Andreas Schwager, Waiblingen (DE); Dietmar Schill, Winnenden (DE); John Christopher Clifton, Hartley Wintney (GB)

(73) Assignee: SONY Corporation, Tokyo (JP)

( * ) Notice: Subject to any disclaimer, the term of this patent is extended or adjusted under 35 U.S.C. 154(b) by 417 days.

(21) Appl. No.: 13/502,774

(22) PCT Filed: Oct. 12, 2010

(86) PCT No.: PCT/EP2010/006222

§ 371 (c)(1), (2), (4) Date: Jun. 11, 2012

(87) PCT Pub. No.: WO2011/050902

PCT Pub. Date: May 5, 2011

(65) Prior Publication Data

US 2012/0243590 A1 Sep. 27, 2012

(30) Foreign Application Priority Data

Oct. 26, 2009 (EP) .................................... 09013491

(51) Int. Cl.
*H04B 1/38* (2006.01)
*H04B 3/56* (2006.01)

(52) U.S. Cl.
CPC .......... *H04B 3/56* (2013.01); *H04B 2203/5454* (2013.01); *H04B 2203/5491* (2013.01)

(58) Field of Classification Search
USPC ........................ 375/222, 257; 703/13, 18, 12; 340/310.11
See application file for complete search history.

(56) References Cited

U.S. PATENT DOCUMENTS 6,005,477 A 12/1999 Deck et al.
7,158,013 B2 1/2007 Schwager et al.
7,702,085 B2 4/2010 Zumkeller et al.

(Continued)

FOREIGN PATENT DOCUMENTS

CN 1312621 A 9/2001
CN 2453597 Y 10/2001

(Continued)

OTHER PUBLICATIONS

International Search Report Issued Apr. 15, 2011 in PCT/JP10/06222 Filed Oct. 12, 2010.

(Continued)

*Primary Examiner* — Eva Puente

(74) *Attorney, Agent, or Firm* — Oblon, McClelland, Maier & Neustadt, L.L.P.

(57) ABSTRACT

A device including a power input supplying external AC power to the device via a power cord, a filter filtering noise from outside of the supplied external AC power and thereby generating a filtered AC power, at least one power socket supplying the filtered AC power to at least one other device, and a PLC modem configured to be connected to the at least one power socket and to transmit data to or receive data from the at least one other device via power line communication using the filtered AC power. The device may be used in power line communication systems. A power line communication method uses the device for isolating a power line communication network from a mains grid.

16 Claims, 4 Drawing Sheets

105
104
110
106
120
102
101
107
130
103
100

(56) References Cited

U.S. PATENT DOCUMENTS

| | | | | |
|---|---|---|---|---|
| 7,885,633 | B2 | 2/2011 | Schwager et al. | |
| 7,962,118 | B2 | 6/2011 | Schwager et al. | |
| 8,140,049 | B2 | 3/2012 | Schwager et al. | |
| 8,160,162 | B2 | 4/2012 | Stadelmeier et al. | |
| 2005/0010954 | A1 | 1/2005 | Binder | |
| 2006/0038660 | A1* | 2/2006 | Doumuki et al. | 340/310.11 |
| 2007/0268989 | A1 | 11/2007 | Schwager et al. | |
| 2008/0137761 | A1 | 6/2008 | Stadelmeier et al. | |
| 2009/0060060 | A1 | 3/2009 | Stadelmeier et al. | |
| 2010/0027600 | A1 | 2/2010 | Schwager et al. | |
| 2010/0195744 | A1 | 8/2010 | Schwager et al. | |
| 2010/0308851 | A1 | 12/2010 | Schwager et al. | |
| 2011/0051786 | A1 | 3/2011 | Schwager et al. | |
| 2011/0110408 | A1 | 5/2011 | Schwager et al. | |
| 2011/0116555 | A1 | 5/2011 | Schwager et al. | |
| 2011/0142110 | A1 | 6/2011 | Schwager | |
| 2011/0196634 | A1 | 8/2011 | Kemp et al. | |
| 2011/0206140 | A1 | 8/2011 | Schwager et al. | |
| 2011/0317784 | A1 | 12/2011 | Schwager et al. | |
| 2012/0147938 | A1 | 6/2012 | Schwager et al. | |
| 2012/0163436 | A1 | 6/2012 | Stadelmeier et al. | |
| 2014/0089502 | A1* | 3/2014 | Husney | 709/224 |
| 2014/0129688 | A1* | 5/2014 | Asenjo et al. | 709/221 |
| 2014/0136881 | A1* | 5/2014 | Vasseur et al. | 714/4.11 |
| 2014/0181187 | A1* | 6/2014 | Stevens et al. | 709/203 |

FOREIGN PATENT DOCUMENTS

| | | | |
|---|---|---|---|
| CN | 2473818 | Y | 1/2002 |
| CN | 1871750 | A | 11/2006 |
| CN | 101010885 | A | 8/2007 |
| JP | 2008 72749 | | 3/2008 |
| JP | 2008 148062 | | 6/2008 |

OTHER PUBLICATIONS

Combined Office Action and Search Report issued Jan. 2, 2014 in Chinese Patent Application No. 201080047357.5 (English language translation only).

U.S. Appl. No. 12/273,151, filed Nov. 18, 2008, Schneider, et al.

U.S. Appl. No. 13/352,788, filed Jan. 18, 2012, Schwager.

U.S. Appl. No. 13/391,645, filed May 7, 2012, Schwager, et al.

U.S. Appl. No. 13/417,550, filed Mar. 12, 2012, Eitel, et al.

U.S. Appl. No. 13/465,420, filed May 7, 2012, Schneider, et al.

U.S. Appl. No. 13/517,477, filed Jun. 20, 2012, Schwager, et al.

Combined Chinese Office Action and Search Report issued Sep. 26, 2014 in Patent Application No. 201080047357.5 (submitting English language translation only).

* cited by examiner 110
120
130
100
107
106
104
105
103
101
102

210
220
230
214
215
224
225
234
235
211
221
231
212
222
232
110
120
130
200
104
106
107
100
105
103
101
102

DEVICE FOR USE IN A POWER LINE COMMUNICATION SYSTEM, POWER LINE COMMUNICATION SYSTEMS AND POWER LINE COMMUNICATION METHOD

The invention relates to a device, which may be used in a power line communication system. The invention further relates to corresponding PLC systems and a power line communication method.

BACKGROUND

Power line communication (PLC), also called mains communication, power line transmission (PLT), broadband power line (BPL), power band or power line networking (PLN), is a term describing a method for using power distribution wires for simultaneous distribution of data. A carrier can communicate voice and data by superimposing an analogue signal over the standard 50 Hz or 60 Hz alternating current (AC). For indoor applications PLC equipment can use household electrical power wiring as a transmission medium.

However, power line communication between devices within a power line communication system may be interfered by other devices or systems outside the power line communication system but connected to the same electrical power wiring, e.g. vacuum cleaner, electric drill or switching power supplies, by other external sources, e.g. other PLC systems, by disturbances in the mains power network or by other noise sources.

Therefore, other carriers for distributing data are used for short distances between devices communicating with each other, for instance HDMI cable. This may result in a plurality of cables connecting different communicating devices with each other or in a complicated network architecture.

It is an object of the invention to enable a power line communication between a plurality of devices of a power line communication system without interferences from outside the power line communication system. Another object of this invention is to provide a power line communication system, which does not interfere with other devices or systems connected to the mains anywhere in the building. These other devices or systems might be radio receivers, other PLC systems, etc.

The objects are solved by a device according to claim 1, by power line communication systems according to claims 7 and 12, respectively, and by a power line communication method according to claim 15.

Further embodiments are defined in the dependent claims.

Further details of the invention will become apparent from a consideration of the drawings and ensuing description.

DETAILED DESCRIPTION

In the following, embodiments of the description are described. It is important to note that all described embodiments in the following and their properties and technical features may be combined in any way, i.e. there is no limitation that certain described embodiments, properties and technical features may not be combined with others.

Figure 1:
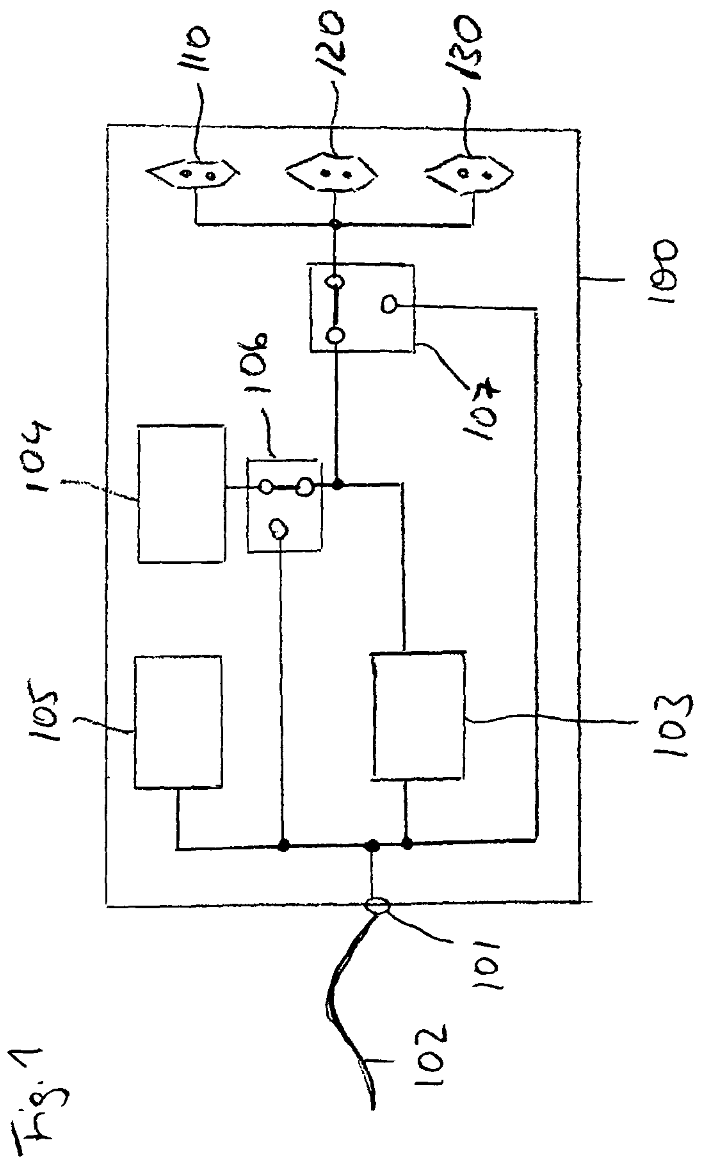
FIG. 1 shows a schematic block diagram of a device according to an embodiment of the invention.

In FIG. 1, a schematic block diagram of a device 100 is depicted, which may be used in a power line communication system. The device 100 comprises a power input 101 for supplying an external AC power to the device 100 via a power cord 102, which is connected to a power outlet (not shown) connected to a mains power network or a domestic power network (household electrical power wiring), for instance a wall outlet within a flat or a single-family house. Please note, that under "power input", any input for supplying an external AC power may be understood, for instance an input terminal arranged at an outside of a device and configured to be connected to a plug of a power cord or an internal connection of a power cord to internal components of a device. Further, under "power cord", a power cord having any length or even only a plug connected to a power input may be understood. The device 100 further comprises a filter 103, the input of which is connected to the power input 101 and which is configured to filter noise from outside the device 100 out of the supplied external AC power. Thereby the filter 103 generates a filtered AC power, which is supplied at the output of the filter 103. The output of the filter 103 is connected with at least one embedded power socket for supplying the filtered AC power to at least one other device. The at least one power socket may be placed, for example, at a rear side of the device 100.

In FIG. 1, three power sockets 110, 120, 130 are depicted for connecting up to three other devices to the device 100 and for supplying these other devices with the filtered AC power. However, the device 100 may comprise any number of power sockets as far as requirements of power consumption and safety are met. Furthermore, the power sockets 110, 120, 130 may be of any type, for instance Type A, B, C, D, E, F, G, I, K, L or M, and individual power sockets may be of different types.

The filter 103 may be any kind of electronic filter, which is suited to filter noise out of the external AC power supplied at the power input 101. That is, the filter 103 may be a passive or an active filter, an analog or a digital filter, a high-pass, a low-pass or a bandpass filter or a combination of different filters. The filter 103 removes unwanted frequency components from the external AC power, which could interfere a power line communication. The filter 103 generates a filtered AC power comprising no interfering frequency components or at least less interfering frequency components compared to the external AC power. A power line communication using the filtered AC power is characterized by an increased communication quality and communication reliability as well as a higher data throughput compared with a power line communication using the external AC power.

Furthermore, the filter 103 removes frequency components of a power line communication system using the filtered AC power such that they do not interfere any devices connected to the external AC power.

The filter 103 isolates a power line communication network using the filtered AC power from a mains grid, for instance of a building, in both directions such that the power line communication network is not interfered by other devices or power line communication networks using the external AC power and does not interfere other devices or power line communication networks using the external AC power.

The device 100 is configured to supply at least one other device with a filtered AC power via a power cord connected with the at least one embedded power socket. Thus, the at least one other device may not be connected to the mains power network or the domestic power network at any outlet.

The device 100 comprises a PLC modem 104, which is configured to be connected to at least one of the power sockets 110, 120, 130 and to transmit data to or receive data from another device (not shown in FIG. 2) connected to the one of the power sockets 110, 120, 130 connected with the PLC modem 104. For power line communication between the PLC modem 104 and the other device connected to the one of the power sockets 110, 120, 130, the filtered AC power provided by the filter 103 is used. That is, data are modulated on the filtered AC power, when the PLC modem 104 and the one of the power sockets 10, 120, 130 are connected to the output of the filter 103.

Optionally, the device 100 may comprise at least one further component 105, for instance a microcomputer, a display or any other component, wherein the at least one further component 105 is configured to be connected with the power input 101 and to be supplied with the external AC power. Thus, the at least one further component 105 does not interfere power line communication using the filtered AC power by creating noise.

The device 100 may further comprise a second switch 107. The second switch 107 is configured to connect the at least one power socket 110, 120, 130 to the PLC modem 104 and to the output of the filter 103 in a first switching state, as shown in FIG. 1. This allows a device connected to the at least one of the power sockets 110, 120, 130 to communicate with the PLC modem 104 using the filtered AC power. In a second switching state, the second switch 107 is configured to connect the at least one power socket 110, 120, 130 to the power input 101. Thus, the filter 103 is shortcut, and a device connected to the at least one of the power sockets 110, 120, 130 can communicate directly with other devices connected to the mains power network or the domestic power network using the external AC power.

The device 100 may further comprise a second switch 107. The second switch 107 is configured to connect the at least one power socket 110, 120, 130 to the PLC modem 104 and to the output of the filter 103 in a first switching state, as shown in FIG. 1. This allows a device connected to the at least one of the power sockets 110, 120, 130 to communicate with the PLC modem 104 using the filtered AC power. In a second switching state, the second switch 106 is configured to connect the at least one power socket 110, 120, 130 to the power input 101. Thus, the filter 103 is shortcut, and a device connected to the at least one of the power sockets 110, 120, 130 can communicate directly with other devices connected to the mains power network or the domestic power network using the external AC power.

Alternatively, the PLC modem 104 may operate as a gateway between a device connected to the at least one of the power sockets 110, 120, 130 and the mains power network or the domestic power network. That is, the PLC modem 104 may bridge the PLC data from an internal network, which is used for communication between the PLC modem 104 and the at least one device connected to the at least one of the power sockets 110, 120, 130, to the outside.

The device 100 may comprise the first switch 106 or the second switch 107 or the first and the second switch 106, 107. If the device 100 comprises the first and the second switch 106, 107, there are different combinations of switching states possible. Furthermore, the first and the second switch 106, 107 may be integrated in one switching means.

The device 100 may be, for example, a set-top box, a playstation, a HDD recorder, a radio receiver, a computer, a HiFi amplifier, any system component of a HiFi rack, a timer unit, or an external power supply for several units.

Examples for other devices connected to the at least one power socket 110, 120, 130 of the device 100 may be a TV, a CD player, a HiFi amplifier, any system component of a HiFi rack, a timer unit, or an external power supply for several units.

Figure 2:
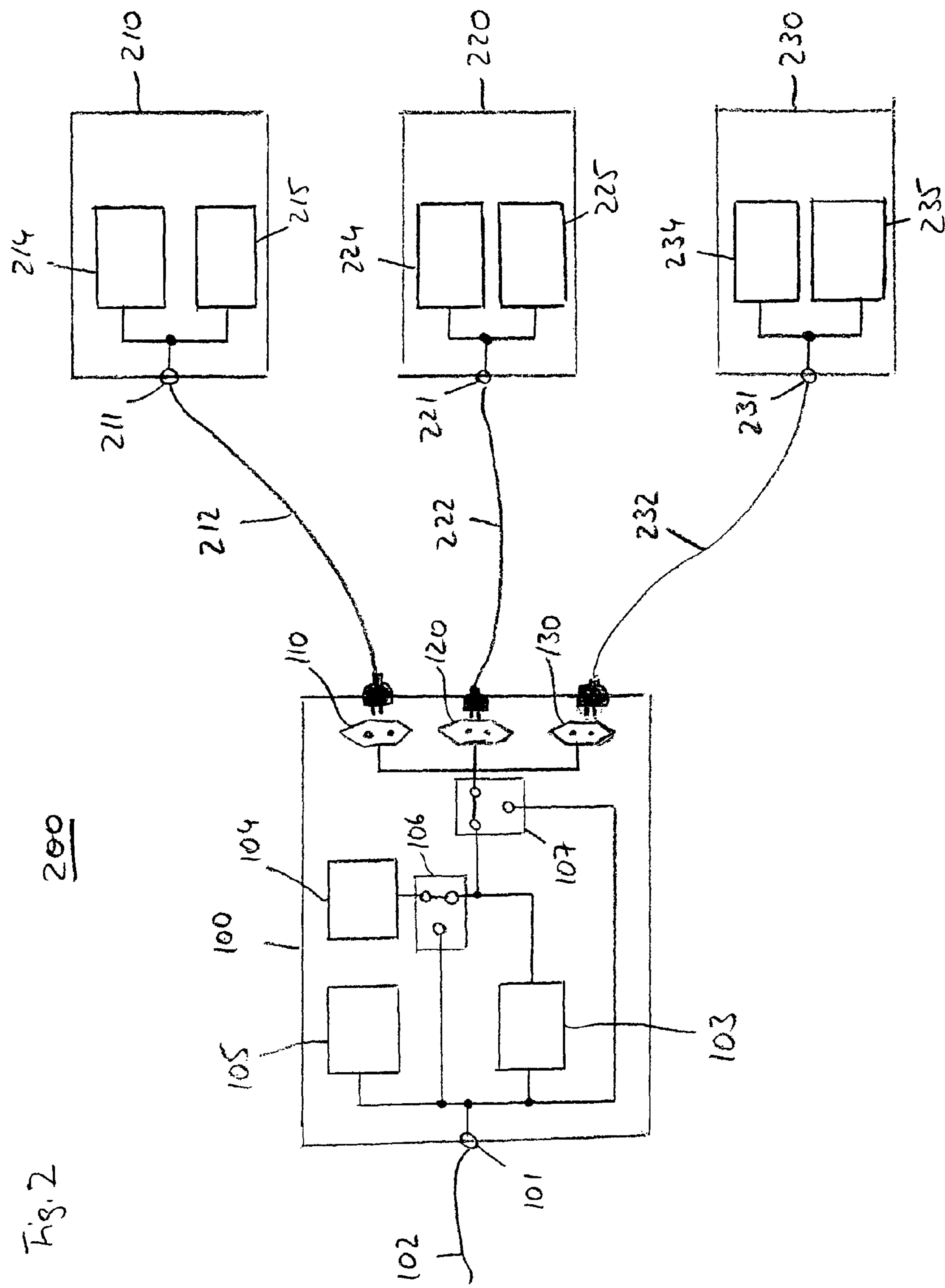
FIG. 2 shows a schematic block diagram of a power line communication system according to an embodiment of the invention, wherein all devices comprise a PLC modem.

FIG. 2 depicts a schematic block diagram of a power line communication system 200 according to an embodiment of the invention. The PLC system 200 comprises a first device 100 and at least one second device. In FIG. 2, three second devices 210, 220, 230 are depicted by way of example. However, the system 200 may comprise any number of second devices, for instance only one or more than three.

The first device 100 complies with the device 100 described with respect to FIG. 1. The first device 100 comprises a first power input 101 for supplying an external AC power to the first device 100 via a first power cord 102, which is connected to a power outlet (not shown) connected to a mains power network or a domestic power network. The first device 100 further comprises a filter 103, the input of which is connected to the first power input 101 and which is configured to filter noise from outside the first device 100 out of the supplied external AC power. Thereby the filter 103 generates a filtered AC power, which is supplied at the output of the filter 103. The output of the filter 103 is connected with at least one embedded power socket for supplying the filtered AC power to the at least one second device. In FIG. 2, three power sockets 110, 120, 130 are depicted by way of example. However, the first device 100 may comprise any number of power sockets, wherein the number of power sockets at least equals the number of second devices of the system 200. That is, for example, if the number of second devices is 2, the number of power sockets is 2 or more than 2.

The device 100 further comprises a PLC modem 104. The PLC modem 104 is configured to be connected to the at least one power socket 110, 120, 130 and to transmit data to or receive data from the at least one second device 210, 220, 230.

Each of the second devices 210, 220, 230 comprises a second power input 211, 221, 231, respectively, for supplying an AC power to the second device 210, 220, 230 via a respective second power cord 212, 222, 232, which is configured to be connected to one of the power sockets 110, 120, 130. The plug of the second power cord 212, 222, 232 should be adapted to the type of the power socket 110, 120, 130, to which it is connected. The AC power supplied to the second device 210, 220, 230 may be the filtered AC power generated by the filter 103 or may be the external AC power, if the first device 100 comprises a second switch 107 as described above.

Each of the second devices further comprises a respective second PLC modem 214, 224, 234 which is configured to be connected to the respective second power input 211, 221, 231 and to transmit data to or receive data from the first PLC modem 104 or from another device via power line communication.

That is, the first device 100 may communicate with at least one of the second devices 210, 220, 230 via power line communication using the filtered AC power. Furthermore, at least one second device 210, 220, 230 can communicate directly with another second device 210, 220, 230 via power line communication using the filtered AC power. If the first device 100 comprises a first switch 106 as described above, the first device 100 may communicate with other devices connected to the mains power network or the domestic power network using the external AC power in a second switching state of the first switch 106. Furthermore, the first PLC modem 104 may bridge data from at least one of the second devices 210, 220, 230 to other devices connected to the mains power network or the domestic power network using the external AC power. If the first device 100 comprises a second switch 107 as described above, the second devices 210, 220, 230 may communicate directly with other devices connected to the mains power network or the domestic power network in a second switching state of the second switch 107, wherein the external AC power is used for power line communication.

Optionally, each or some of the second devices 210, 220, 230 may comprise at least one further component 215, 225, 235, respectively, wherein the further components use the AC power supplied by the respective second power inputs 211, 221, 231. Examples of further components 215, 2225, 235 are a display, a microcontroller, a loud speaker or others.

The first device 100 of the PLC system 200 may be, for example, a set-top box, a playstation, a HDD recorder, a radio receiver, a computer, a HiFi amplifier, any system component of a HiFi rack, a timer unit, or an external power supply for several units.

Examples for second devices of the PLC system 200 may be a TV, a CD player, a HiFi amplifier, any system component of a HiFi rack, a timer unit, or an external power supply for several units.

The system 200 may, for instance, be a HiFi application system or any other system using one external power supply for several units.

Figure 3:
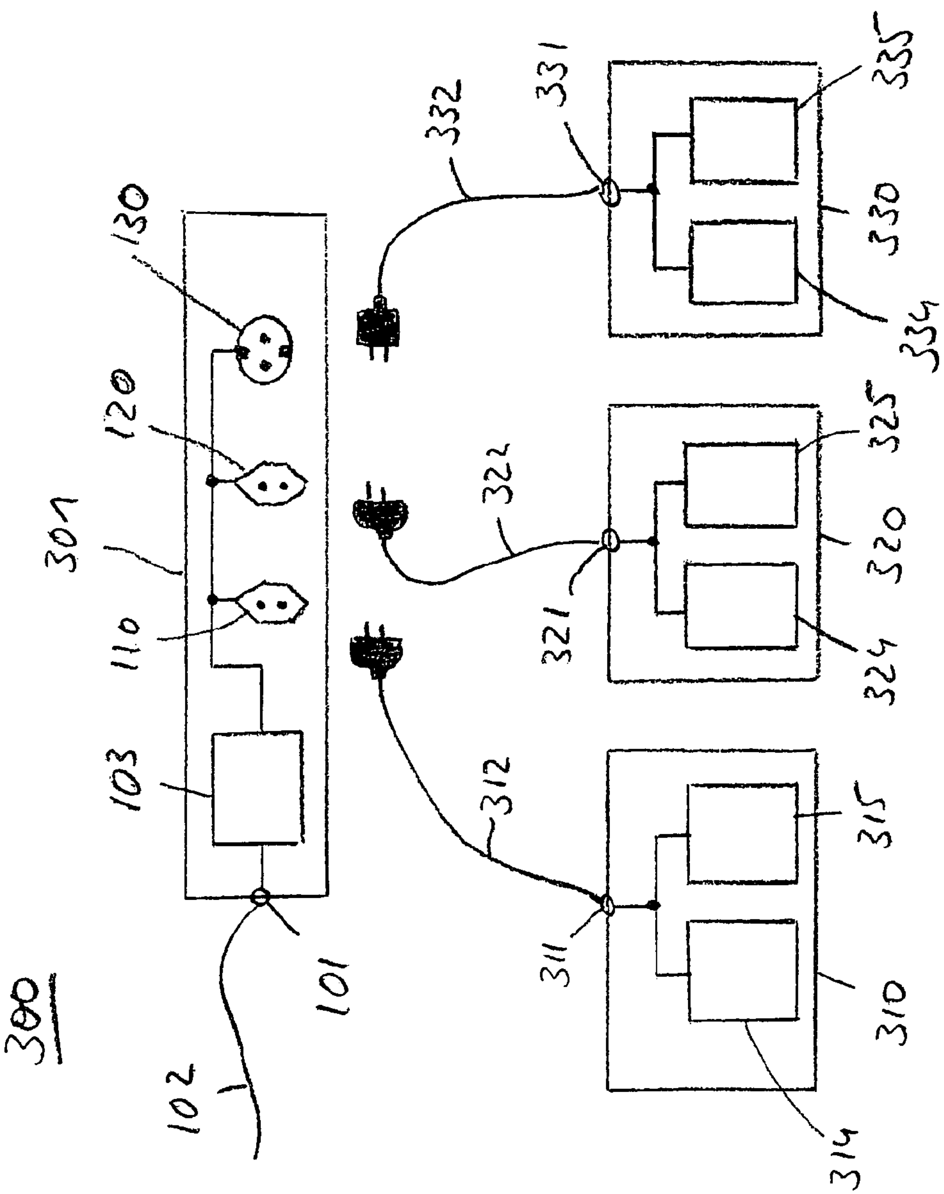
FIG. 3 shows a schematic block diagram of a power line communication system according to a further embodiment of the invention, wherein the PLC system is isolated from a mains power network by a first device not comprising a PLC modem.

In FIG. 3, a schematic block diagram of a power line communication system 300 according to another embodiment of the invention is depicted. The PLC system 300 comprises a first device 301 and a plurality of second devices. In FIG. 3, three second devices 310, 320, 330 are depicted by way of example. However, the system 300 may comprise any number of second devices larger than 1, for instance two or more than three.

The first device 301 comprises a first power input 101 for supplying an external AC power to the first device 301 via a first power cord 102, which is connected to a power outlet (not shown) connected to a mains power network or a domestic power network. The first device 301 further comprises a filter 103, the input of which is connected to the first power input 101 and which is configured to filter noise from outside the first device 301 out of the supplied external AC power. Thereby the filter 103 generates a filtered AC power, which is supplied at the output of the filter 103. The output of the filter 103 is connected with a plurality of embedded power sockets for supplying the filtered AC power to the plurality of second devices. In FIG. 3, three power sockets 110, 120, 130 are depicted by way of example. However, the first device 301 may comprise any number of power sockets, wherein the number of power sockets at least equals the number of second devices of the system 300. That is, for example, if the number of second devices is 2, the number of power sockets is 2 or more than 2. In contrast to the device 100 described with respect to FIG. 1, the first device 301 does not comprise a PLC modem. Optionally, the first device 301 may comprise a switch similar to the second switch 107 described with respect to FIG. 1.

Each of the second devices 210, 220, 230 comprises a second power input 211, 221, 231, respectively, for supplying the filtered AC power to the second device 210, 220, 230 via a respective second power cord 212, 222, 232, which is configured to be connected to one of the power sockets 110, 120, 130. The plug of the second power cord 212, 222, 232 should be adapted to the type of the power socket 110, 120, 130, to which it is connected.

Each of the second devices further comprises a respective PLC modem 214, 224, 234, which is configured to be connected to the respective second power input 211, 221, 231 and to transmit data to or receive data from at least one other PLC modem 214, 224, 234. Since filtered AC power is used for power line communication, the PLC system 300 communicates isolated from the mains power network or the domestic power network using the external AC power.

The first device 301 of the PLC system 300 supplies the filtered AC power to the second devices 210, 220, 230 and thus provides a AC power without interferences from outside for power line communication between the second devices 210, 220, 230. The first device 301 itself does not communicate with other devices within the PLC system 300.

Optionally, each or some of the second devices 210, 220, 230 may comprise at least one further component 215, 225, 235, respectively, wherein the further components are supplied with the filtered AC power.

The first device 301 of the PLC system 300 may, for example, be a multiple extension power strip or a multi-outlet power strip including a plurality of power sockets, and the second devices of the system 300 may be, for instance, selected from the group comprising a set-top box, a playstation, a HDD recorder, a radio receiver, a computer, a TV, a CD player, a HiFi amplifier, any system component of a HiFi rack, a timer unit, or an external power supply for several units.

Often, different devices being able to communicate with each other are placed, for instance, in one room and are separated from each other only by a short distance. If these devices want to communicate with each other, data might be distributed by HDMI cable connected to at least two of the devices or by a wireless link, for example. Distributing data between a first device and second devices as described with respect to the PLC system 200 or between second devices as described with respect to the PLC system 300 via power line communication using a filtered AC power according to the invention may replace HDMI cables, IEEE 1394, VGA, DVI, USB, eSATA, ETH or others. As well, the invention may replace wireless links like IEEE 802.11, WiFi, WHDI, UWB, Wireless HDMI, Wireless HD, Wireless USB, ZigBee, Bluetooth or others. This renders the assembly and the architecture of the system comprising the devices communicating with each other more simple compared to a HDMI cable based system, since no cable other than the power cord is required for each device. Furthermore, each device can communicate with each other device without the necessity of a bridging component transferring data received by a first HDMI cable to a second HDMI cable. Compared to a system based on wireless links between the devices communicating with each other, the PLC systems according to the invention are cheaper and more reliable.

Furthermore, the devices of the PLC systems according to the invention may reduce their feeding signal level to a minimum using adaptive power management. This relaxes requirements to the filter 103 and reduces interferences of other devices and systems caused by the devices of the PLC system.

On the other hand, the power line network of the PLC systems according to the invention may use higher power levels, since the power line network is isolated from the mains power network or from the domestic power network by the filter 103.

Figure 4:
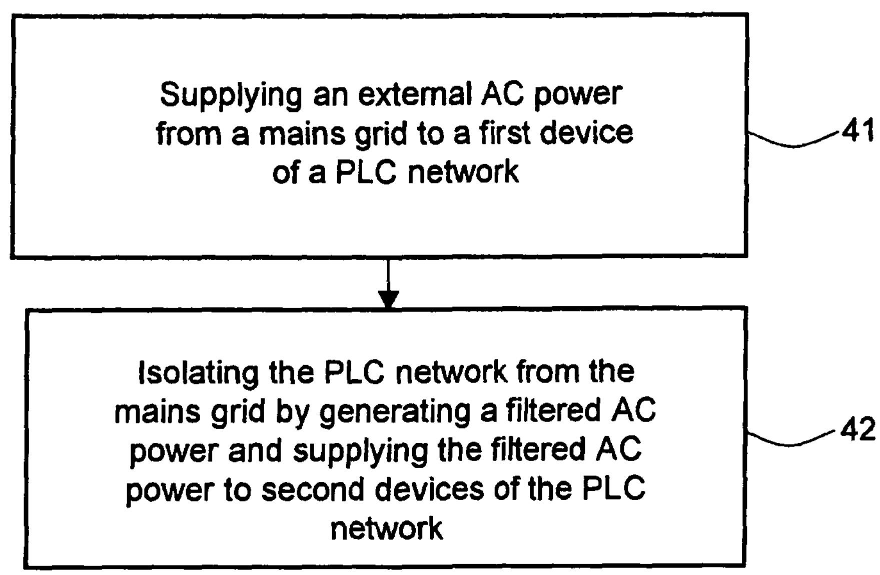
FIG. 4 shows a flow chart of a power line communication method according to an embodiment of the invention.

FIG. 4 illustrates a flow chart of a power line communication method. The method for power line communication within a power line communication network including a first device and at least one second device comprises supplying an external AC power from a mains grid to the first device (step 41) and isolating the power line communication network from the mains grid (step 42). The first device may participate in the power line communication within the PLC network or may only supply a filtered AC power used for power line communication between the second devices within the PLC network. The external AC power may be supplied to the first device, for example, by a power cord connected with a power input of the first device on the one hand and with a power outlet of the main grid, for instance a building or a mains power network, on the other hand.

The power line communication network is isolated from the mains grid by generating a filtered AC power within the first device by a filter filtering noise from the mains grid out of the external AC power, by supplying the filtered AC power to the at least one sec- and device and by using the filtered AC power for power line communication within the PLC network. The noise, which should be filtered out from the external AC power, may be caused, for example, by interferences from other devices or other PLC networks connected to the external AC power. The filtered AC power may be supplied to the at least one second device, for instance, by a power cord connected with a power input of the second device on the one hand and with a power socket being part of the first device. The power socket of the first device is configured to be connected with the outlet of the filter.

The invention claimed is:

1. A device, comprising:
- a power input configured to supply an external AC power to the device;
- a filter configured to filter noise from outside out of the supplied external AC power and to thereby generate a filtered AC power;
- at least one power socket configured to supply the filtered AC power to at least one other device;
- a PLC modem configured to be connected to the at least one power socket and to transmit data to or receive data from the at least one other device via power line communication using the filtered AC power; and
- a first switch configured to connect an output of the PLC modem to the at least one power socket in a first switching state thereof and to connect the output of the PLC modem to the power input in a second switching state thereof,
- wherein the PLC modem is not connected to the at least one power socket in the second switching state and is not connected to the power input in the first switching state.

2. A device according to claim 1, wherein the filter is adapted to isolate a power line communication network including the device and the at least one other device from a mains grid supplying the external AC power.

3. A device according to claim 1, further comprising a second switch configured to connect the at least one power socket with the PLC modem in a first switching state thereof and to connect the at least one power socket with the power input in a second switching state thereof.

4. A device according to claim 3, wherein the first switch and the second switch are integrated in one switching element.

5. A device according to claim 1, wherein at least one of the device or at least one other device is one of set-top box, a playstation, a HDD recorder, a radio receiver, a TV, a CD player, a HiFi amplifier, a system component of a HiFi rack, a timer unit, or an external power supply for plural units.

6. A power line communication system comprising:
- a first device including:
  - a first power input configured to supply an external AC power to the first device,
  - a filter configured to filter noise from outside out of the supplied external AC power and to thereby generate a filtered AC power,
  - at least one power socket configured to supply the filtered AC power to at least one second device, and
  - a first PLC modem configured to be connected to the at least one power socket and to transmit data to or receive data from the at least one second device via power line communication using the filtered AC power; and
- at least one second device including:
  - a second power input configured to supply an AC power to the second device configured to be connected to one of the at least one power socket of the first device, and
  - a second PLC modem configured to be connected to the second power input and to transmit data to or receive data from the first PLC modem or from another device via power line communication,
- wherein the first device further includes a first switch configured to connect the first PLC modem to the second PLC modem in a first switching state of the first switch and to connect the first PLC modem to the first power input in a second switching state of the first switch, and
- wherein the PLC modem of the first device is not connected to second PLC modem in the second switching state of the first switch.

7. A power line communication system according to claim 6, wherein the first device further includes a second switch configured to connect the second PLC modem to the first PLC modem in a first switching state of the second switch and to connect the second PLC modem to the first power input in a second switching state of the second switch.

8. A power line communication system according to claim 6, wherein the system is a HiFi application system or a system using one external power supply for plural units.

9. A power line communication system according to claim 6, wherein at least one of the first device or at least one second device is one of a set-top box, a playstation, a HDD recorder, a radio receiver, a TV, a CD player, a HiFi amplifier, a system component of a HiFi rack, a timer unit, or an external power supply for plural units.

10. A power line communication system comprising:
- a first device including:
  - a first power input configured to supply an external AC power to the first device,
  - a filter configured to filter noise from outside out of the supplied external AC power and to thereby generate a filtered AC power, and
  - a plurality of power sockets configured to supply the filtered AC power to a plurality of second devices; and
- a plurality of second devices, each second device including:
  - a second power input configured to supply the filtered AC power to the second device, and
  - a PLC modem configured to be connected to the second power input and to transmit data to or receive data from at least one PLC modem of at least one of the other second devices via power line communication using the filtered AC power,
- wherein the first device further includes a first switch configured to connect a PLC modem of the first device to said PLC modem of the second device in a first switching state of the first switch and to connect the PLC modem of the first device to the first power input in a second switching state of the first switch, and wherein the PLC modem of the first device is not connected to said PLC modem of the second device in the second switching state of the first switch.

11. A power line communication system according to claim 10, wherein the filter is adapted to isolate a power line communication network including the plurality of second devices from a mains grid supplying the external AC power.

12. A power line communication system according to claim 10, wherein the first device is a multiple extension power strip or a multi-outlet power strip, and wherein each of the second devices is one of a set-top box, a playstation, a HDD recorder, a radio receiver, a computer, a TV, a CD player, a HiFi amplifier, a system component of a HiFi rack, a timer unit, or an external power supply for plural units.

13. A device according to claim 1, wherein the power input is configured to supply the external AC power to the device via a power cord.

14. A power line communication system according to claim 6, wherein the power input is configured to supply the external AC power to the device via a power cord, and wherein the second power input configured to supply the AC power to the second device via a second power cord configured to be connected to one of the at least one power socket of the first device.

15. A power line communication system according to claim 10, wherein the first power input is configured to supply the external AC power to the first device via a first power cord, and wherein the second power input is configured to supply the filtered AC power to the second device via a second power cord.

16. A power line communication system according to claim 10, further comprising a second switch configured to connect the at least one power socket with the PLC modem in a first switching state thereof and to connect the at least one power socket with the power input in a second switching state thereof.

* * * * *